W. P. WARREN.
Road-Scrapers.
No. 140,175.　　　　　　　　　　　Patented June 24, 1873.
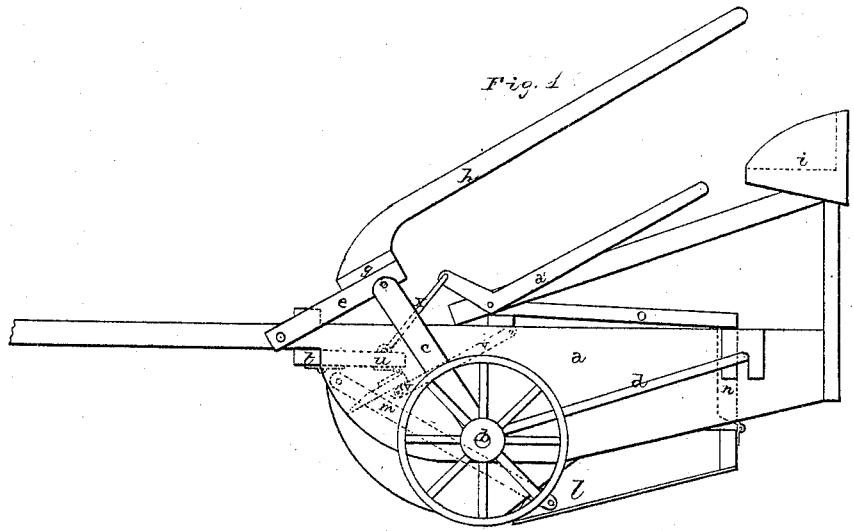
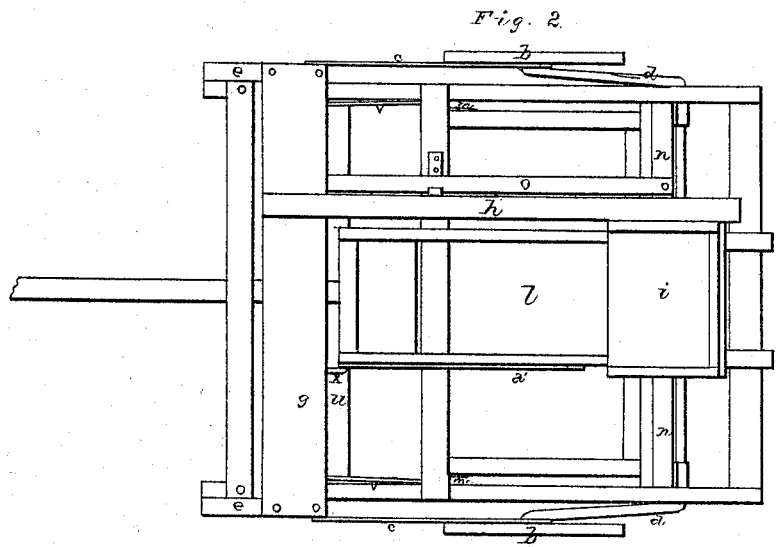

UNITED STATES PATENT OFFICE.

WILLIAM P. WARREN, OF SERENA, ILLINOIS.

IMPROVEMENT IN ROAD-SCRAPERS.

Specification forming part of Letters Patent No. 140,175, dated June 24, 1873; application filed April 7, 1873.

*To all whom it may concern:*

Be it known that I, WM. P. WARREN, of Serena, county of La Salle and State of Illinois, have invented certain new and useful Improvements in Road-Scrapers, of which the following is a specification:

The nature of my invention relates to an improvement in road-scrapers; and it consists in the arrangement and combination of parts, which will be more fully described hereafter, whereby a cheap, simple, and effective machine is produced.

The accompanying drawings represent my invention.

$a$ represents the frame, of any desired shape or size, and which rests upon the wheels $b$ for transportation. These wheels are secured to the pivoted bars $c\ d$, so as to make the body adjustable with reference to the earth, allowing it to be lowered so as to bring the scraper down to the surface of the ground, and then raised up entirely clear of it for transportation. Pivoted to the front end of the frame are the arms $e$, to which the bars $c$ are fastened, the arms being connected together by the cross-piece $g$, to which the operating-lever is secured. This lever $h$ is sufficiently long to extend back within easy reach of the driver on the seat $i$, and by drawing it backward and downward, until it catches under the side of the seat, it depresses the rear ends of the arms $e$, and these arms pressing down upon the bars $c$, the body is raised upward until it runs along upon the wheels $b$, like a wagon, either for transportation from place to place, or with the load to be dumped. As soon as the lever is released the body falls from its own weight so as to bring the scraper $l$ down to the ground. The scraper consists of a metal plate secured to a frame, which has its front end supported by the levers $m$, while it is hinged to the pivoted cross-piece $n$ behind, the pivoted cross-piece having the lever $o$ secured to it. By depressing the lever the scraper is brought into position ready for use; but by raising it the scraper is elevated so as to dump its load. Hinged to the cross-piece $t$, on the front end of the frame, is the folding-board $u$, jointed in the center, and having the lower half attached to an arm, $v$, upon each end. Fastened to the upper half by means of the connecting-rod $x$ is the lever $a'$, by means of which the board is operated.

By moving the lever forward the board is brought downward until its lower edge comes in contact with the front end of the scraper, and thus prevents the load, which the scraper has gathered up, from falling out during transportation. When the lever is drawn backward the board folds up out of the way.

Having thus described my invention, what I claim as new, and desire to secure by Letters Patent, is—

1. The wheels $b$, secured to the bars $c\ d$, and operated by means of the lever $h$, for the purpose of lowering and raising the body, substantially as set forth.

2. The folding-board $u$, in combination with the arms $v$ and lever $a'$, substantially as shown.

3. The scraper $l$, links $m$, levers $o$, and cross-piece $n$, substantially as specified.

4. The combination of the folding-board $u$ and scraper $l$, when the two parts are combined to operate as described.

In testimony that I claim the foregoing as my invention, I hereunto affix my signature this 1st day of April, 1873.

WILLIAM P. WARREN.

Witnesses:
  CHAS. H. HOAG,
  PHILIP COLE.